Nov. 15, 1949
H. E. KRAUS
2,488,296
WORK SUPPORT
Filed June 3, 1946
2 Sheets-Sheet 2
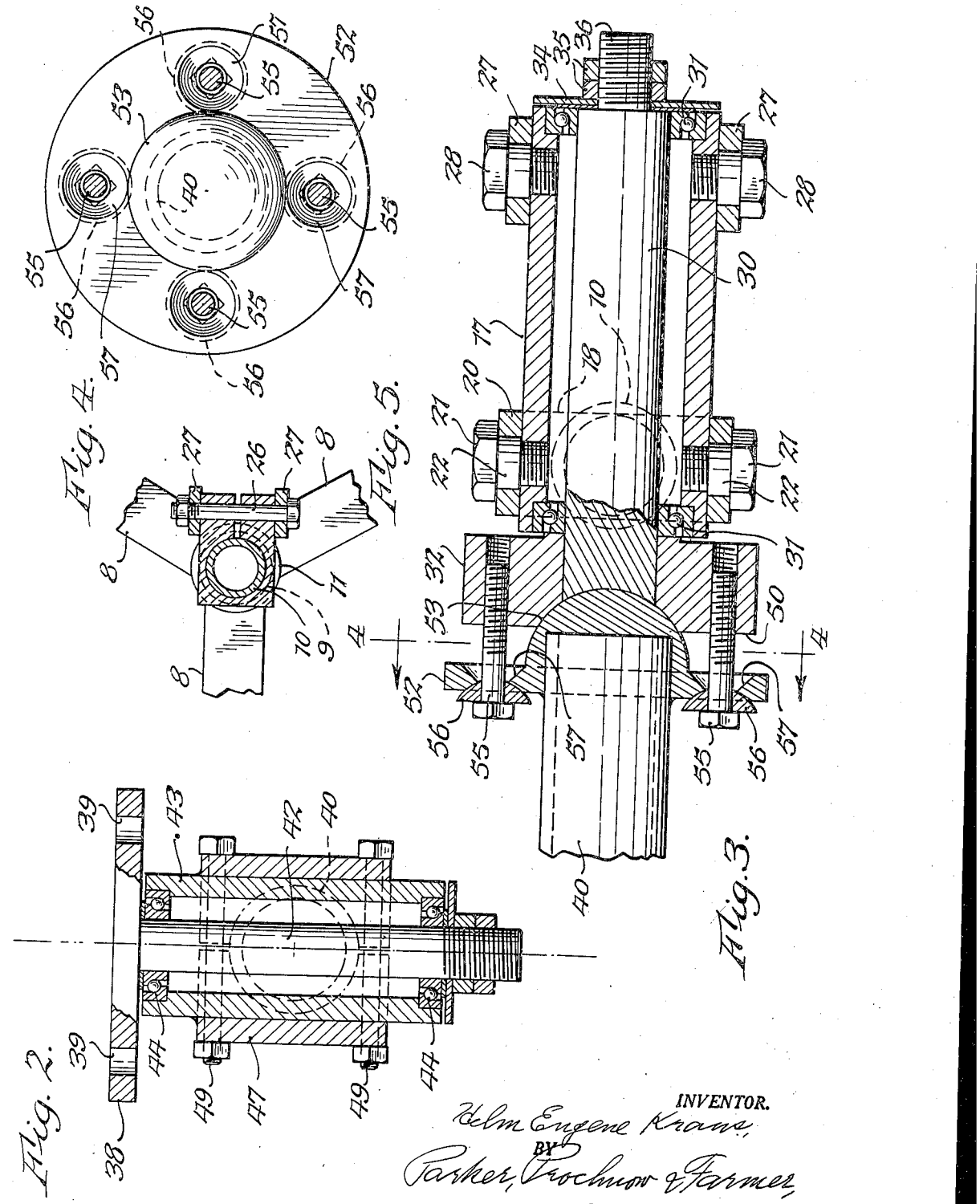
INVENTOR.
Helm Eugene Kraus,
BY
Parker, Trochnow & Farmer,
Attorneys.

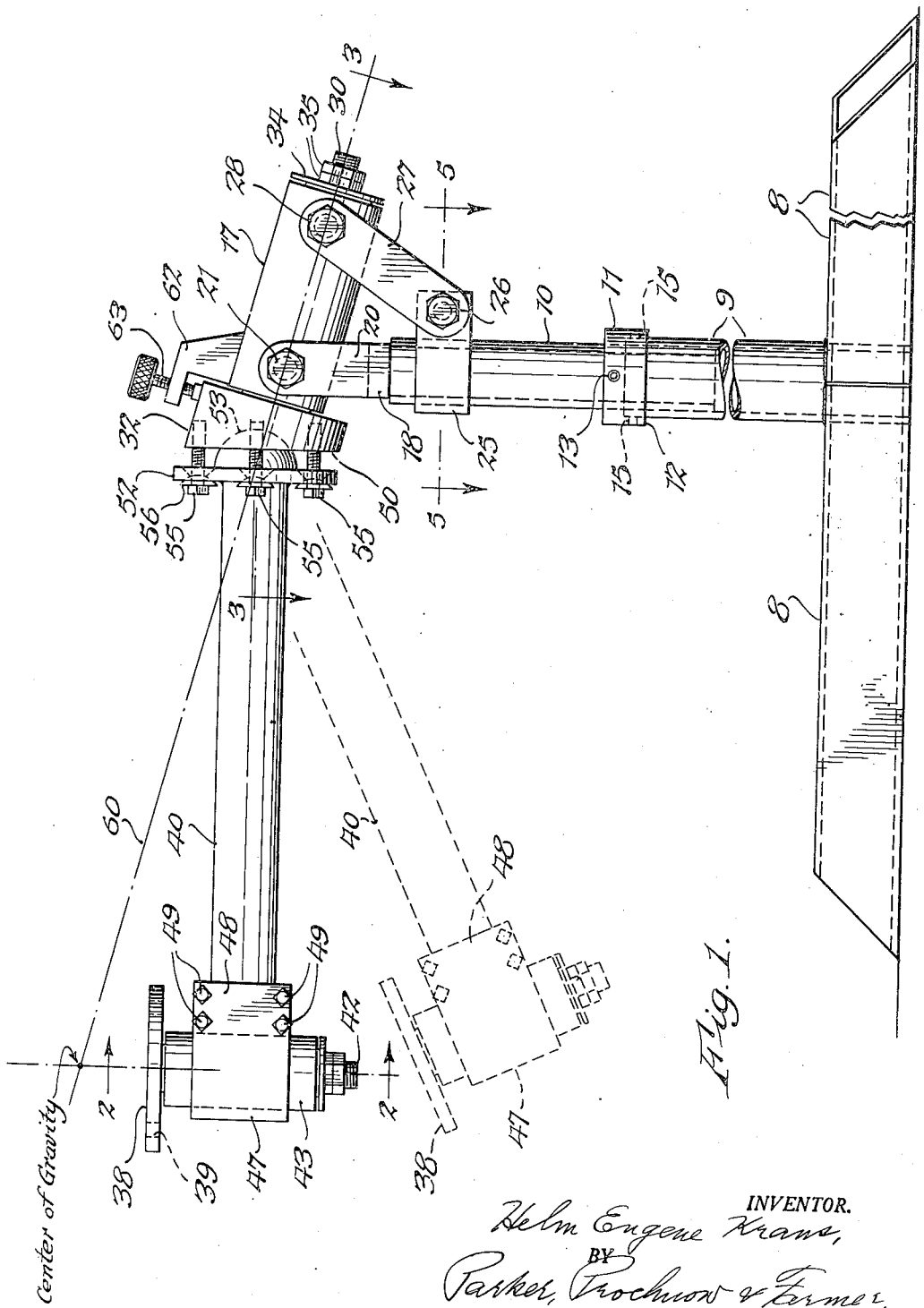

Patented Nov. 15, 1949

2,488,296

UNITED STATES PATENT OFFICE 2,488,296

WORK SUPPORT

Helm Eugene Kraus, Arcade, N. Y., assignor to Lee J. Drennan, Inc., Arcade, N. Y.

Application June 3, 1946, Serial No. 674,130

1 Claim. (Cl. 29—288)

This invention relates to improvements in work supports or positioners of the type by means of which an article may be supported in various positions while work is being done on the same.

Work holders or positioners have heretofore been made in which the work is balanced by counterweights so that the work could readily be turned from one position to the other during various operations on the work. These counterweights have to be changed or shifted in accordance with the work. Power driven positioners have also been used, but these are expensive to install and operate and there are always some positioners in which an article cannot be supported by a power operated positioner.

One of the objects of this invention is to provide a work support of improved construction by means of which articles of various shapes, and of any size within the limits of the capacity of the support, may be supported thereon in balanced position without requiring the use of counterweights, so that the articles can be easily moved into any desired position to work thereon, and will remain in such position until they are again moved to another position. Another object is to provide a device of this type including a work supporting table mounted on an arm having a universal joint connection with a rotatable shaft so that the arm and table may be secured in various positions to enable the center of gravity of the work, table and arm to be located in the axis of rotation of the rotatable shaft, so that the work will be in balanced position with reference to the axis of rotation in any position about the axis. Another object of this invention is to provide a device of this type with means of improved construction for adjusting the work supporting table and its arm in such a manner that the work, table and arm may be readily arranged so that its center of gravity will lie in the axis of rotation of a pivot about which the work may be turned. A further object of this invention is to provide a device of this kind with means for releasably locking the work in any desired position about its axis of rotation.

Other objects and advantages of this invention will appear from the following description and claim.

In the accompanying drawings:

Fig. 1 is a side elevation of a work support embodying this invention.

Fig. 2 is a fragmentary sectional elevation thereof, on line 2—2, Fig. 1, on an enlarged scale.

Fig. 3 is a sectional plan view thereof, on line 3—3, Fig. 1.

Fig. 4 is a section thereof, on line 4—4, Fig. 3.

Fig. 5 is a fragmentary sectional plan view thereof, on line 5—5, Fig. 1.

In the particular embodiment of the invention illustrated by way of example in the drawings, the work support and positioner is shown as mounted on a suitable base which is arranged to be secured to a floor or other support, the base shown including three horizontal legs 8 which may be of box shape in cross section and which may be welded or otherwise secured together to extend outwardly in different directions from the center of the base, and an upright tubular member or column 9 is rigidly secured, for example, by welding, to the middle portion of the base. Column 9 preferably has a second column member or tube 10 arranged to rotate on an upright axis relatively to the fixed column 9, and for this purpose in the construction shown, the lower portion of the member 10 extends into the column 9 and a collar 11 is secured to the upper column member 10 so as to bear on the upper surface of the fixed column member 9, a plurality of set screws 13 being preferably used to secure the collar to the member 10. The collar 11 may be provided with a downwardly extending annular flange 12 having set screws 15 therein which may engage the upper end of the fixed column member 9 to hold the upper column member 10 against rotation on the member 9. It will be obvious that if the set screws 15 are moved out of engagement with the lower column member 9, the upper column member or tube 10 may rotate freely about the upright axis of the lower column member 9. Any other means for supporting the work support from the floor or other base may be employed, if desired.

17 represents a bearing sleeve about the axis of which the work mounted on the support may revolve for the purpose of presenting different portions of the work into desirable or convenient position to a worker. This bearing sleeve may be of any suitable or desired construction and may be supported in any suitable manner from the upper column member 10. In the construction illustrated the upper column member 10 has a fork or U-shaped part suitably secured thereto, the fork having a base portion 18 which is welded or otherwise rigidly secured to the upper column member 10, and a pair of arms 20 which extend upwardly to opposite sides of the bearing sleeve 17 and which may be pivotally secured to the bearing sleeve 17 in any suitable manner. The arms, for example, may be pivotally secured to the bearing member 17 by means of screws or bolts 21 having a threaded engagement with the bearing sleeve 17 and having cylindrical portions 22 which form pivots extending through holes in the upper portions of the arms 20, see particularly Fig. 3. By means of this construction, a bearing sleeve 17 may be pivotally swung into different angular relations to the upright supporting column.

Means of any suitable or desired type may be employed for securing the bearing sleeve 17 in various angular relations to the supporting column, and in the construction illustrated, this may be accomplished by means of a clamp 25 extending about the upper column member 10, see Figs. 1 and 5, the ends of the clamp being connected by means of a screw or bolt 26 which when tightened draws the clamp into gripping engagement with the upper column member 10 so that the clamp may be positioned at different elevations on this column member. The clamp 25 may be connected with the bearing member 17 by means of a pair of links 27, the lower ends of which are provided with holes through which the bolt 26 extends; and the upper ends of which are pivotally connected to the bearing sleeve 17 by means of screws 28 engaging threaded holes in the sleeve 17, the screws 28 shown being substantially identical with the screws 21, which engage the arms 20 of the forked member. By means of this construction, it will be obvious that the angular relationship of the bearing sleeve 17 may be varied as desired by moving the clamp 25 into different positions along the upright tubular column member 10. Any other means for mounting the bearing sleeve 17 on the supporting column may be provided.

30 represents a shaft or pivot member which is rotatably mounted in the bearing sleeve 17 in any suitable manner and which shaft is held against endwise movement relatively to the bearing sleeve 17. Any type of bearings may be used and in the construction illustrated, ball bearings 31 are provided for mounting the pivot shaft in the bearing sleeve 17 and one end of the shaft has an enlarged flange or coupling member 32 secured thereto, a portion of which engages the inner race of one of the ball bearings to hold the shaft against axial movement in one direction relatively to the bearing sleeve 17. At the other end of the shaft, a thrust disk or collar 34 is provided which bears against the other ball or thrust bearing 31 and which is secured in place by means of nuts 35 having a threaded engagement with a threaded end portion 36 of the shaft 30. By means of this construction, the pivot shaft 30 is free to rotate about its axis and is held against endwise movement relatively to the bearing sleeve 17.

38 represents a work supporting table which may be of any suitable or desired shape or size, and which may, if desired, be provided with holes 39 or other suitable means to facilitate securing thereto the work, or a jig or fixture for the work. This table is rotatably mounted on one end of an arm 40, the other end of which is adjustably mounted on the shaft 30. The work supporting table, which is shown more in detail in Fig. 2, has secured to the middle portion thereof a shaft or pivot member 42 which is rotatably mounted in a bearing sleeve 43, for example, by means of ball bearings 44, so that the table may rotate freely about the axis of its shaft or pivot member 42, which extends approximately perpendicular to the arm 40.

The bearing sleeve 43 may be suitably secured to one end of the arm 40 in any desired manner, for example, by means of a sleeve 47 which may be welded or otherwise secured to the bearing sleeve 43 and which has a pair of outwardly extending flanges 48, the inner surfaces of which are formed to receive one end of the arm 40 and which may be pressed toward each other into clamping engagement with the end of the arm 40 by means of bolts 49. Any other suitable means for rigidly securing the bearing sleeve 43 to one end of the arm 40 may be employed.

The other end of the arm 40 is adjustably secured to the shaft 30 so as to provide a substantially universal adjustment of the arm with reference to the shaft. In the construction shown for this purpose, the enlarged flange or coupling member 32 secured to one end of the shaft 30 preferably has its outer face 50 extending at an angle to the opposite face thereof which is adjacent to the bearing sleeve 17, and the flange or coupling member in the construction illustrated, is provided with a partly spherical recess extending inwardly from the outer face 50 thereof. The adjacent end of the arm 40 is provided with a flange member 52 which has a partly spherical or ball-shaped projection 53 thereon formed to fit within the partly spherical recess in the flange member 32. The flange 52 may be suitably secured to the arm 40 in any desired manner; for example, by welding. Consequently, the arm 40 has a ball and socket joint connection with the shaft 30, thus permitting limited adjustment in different directions of the arm relatively to the shaft.

The adjustments of the arm 40 relatively to the pivot shaft 30 may be effected in any suitable or desired manner. For example, the flange 52 of the arm may be provided with a plurality of holes through which bolts or screws 55 may pass, and the flange member 32 of the shaft 30 is provided with threaded holes in which these bolts may engage. The heads of the bolts may engage washers 56 having rounded partly spherical surfaces formed to engage in correspondingly rounded recesses countersunk in one face of the flange 52 about the holes through which the bolts 55 pass. The holes on the other side of the flange 52 may also be countersunk or flared as illustrated at 57 so as to permit the flange 52 to be supported in various angular relations to the face 50 of the flange 32.

In the use of the device described, an article or workpiece to be operated upon is suitably secured to the work supporting table 38, either by securing the workpiece directly to the table or by mounting the work in a suitable jig or fixture secured to the table. The center of gravity of the work and of the fixture or jig for the work should be so positioned on the table 38 that its center of gravity lies in the axis of the shaft or pivot 42 of the work supporting table. In order to permit the work to be readily turned into various positions and to enable the work to stay in such positions without holding it, the arm 40 is then adjusted relatively to the shaft 30 in such a manner that the center of gravity of the work, the arm 40 and the parts supported thereby including the table 38 and any jig or fixture used for supporting the work, will lie in the axis of the shaft 30 which is represented by the broken line 60 in Fig. 1. In order to bring the center of gravity on the axis 60, the bolts or adjusting screws 55 may be actuated to swing the arm into the desired position by loosening some of the bolts and tightening others. This position can be readily determined by permitting the arm with the work supported thereon to freely rotate with the shaft 30. If the work supported on the table 30 swings downwardly, it is evident that the center of gravity is above the axis 60, and therefore, the outer end of the arm 30 must be lowered. If the arm tends to swing into a position so that the work extends upwardly from the arm, then the center of gravity of the work is below the axis 60 so that the outer end of the arm must be raised. It is, consequently, a comparatively easy matter to adjust the screws 55 so that the arm 40 is in such angular relation to the shaft 30 that the work, the supporting table and arm are balanced so that they will remain in any angular position with reference to the axis 60 in which they are set. When the parts of the work support are set into the correct position for one type of work, any number of similar workpieces of the same type may be mounted on the table 38 without requiring any adjustment of the arm 40. Consequently, a workman may swing the work either about the axis of the shaft 42 of the table 38 or about the axis 60 of the shaft 30 and the work will remain balanced in any position into which it is moved about these two axes. This, consequently, greatly facilitates many operations that may be performed on the work. For example, in welding or brazing, it is generally desirable to position the article in such a manner that the flow of molten material in the joint may be assisted by the force of gravity. In most cases, welded joints are not in a single plane, and therefore, the work must be revolved or moved about so that the molten metal will flow by gravity into the joint.

The positioner described makes it possible to move any article supported thereon with the greatest ease, it generally requiring no more than a finger to move the article into different positions. Consequently, the different portions of the work can be quickly brought to the workman instead of requiring the workman to move around the work, thus greatly reducing the time required to do the work as well as avoiding fatigue of the worker.

If for any reason, it is desired to hold the work in fixed position for a period of time while some pressure is exerted on the same, or for other reasons, the arm 40 can readily be locked in the desired position by any suitable means, and for this purpose, in the particular construction illustrated by way of example, the bearing sleeve 17 has a bracket 62 arranged thereon which extends over a part of the periphery of the flange or coupling member 32, and a set screw 63 may extend through a threaded hole in the arm 62 and engage the periphery of the flange or coupling member 32, thus acting as a brake, to prevent rotation of the shaft 30 or to resist such rotation.

The apparatus may, of course, be adjusted to suit the work which is being done. The collar 11 may be mounted in different positions lengthwise of the column member 10 to raise and lower the support. The bearing sleeve 17 may be adjusted to various angular positions by means of the clamp member 25 to support the work in the desired positions. The arm 40 may be secured in a number of different positions to accommodate the work which is being handled, the broken lines in Fig. 1 showing the arm in a low position which it will occupy when relatively tall articles are mounted on the table 38.

Since the work when mounted on the table 38 may revolve about the shaft 42 of the table as well as the pivot shaft 30, it will be obvious that if the work is properly balanced on the work support, the operator may grasp any part of the work and move it into any desired position, since by means of the two pivot shafts, the work is supported for movement in a complete circle about either pivot. Furthermore, if the set screws 15 are loose, the arm 40 and shaft 30 may be swung in a circle about the column 9.

I claim as my invention:

A work support and positioner for supporting work of various shapes and sizes for rotation in a balanced condition about an axis, said work support and positioner including a rotatable shaft, means for supporting said shaft with its axis in various angular relations to the horizontal, an arm, a work supporting table rotatably mounted on one end of said arm to rotate on an axis substantially perpendicular to said arm, a universal joint connection between the other end of said arm and one end of said shaft for positioning said arm in various angular relations to said shaft, and means for securing said arm in the desired angular relation to said shaft to support the work so that the center of gravity of said arm and the work carried thereby will lie substantially in the axis of rotation of said shaft.

HELM EUGENE KRAUS.

REFERENCES CITED

The following references are of record in the file of this patent:

UNITED STATES PATENTS

| Number | Name | Date |
| --- | --- | --- |
| Re. 14,796 | Mennie | Jan. 27, 1920 |
| 105,507 | Stephens | July 19, 1870 |
| 504,773 | Baderstochen | Sept. 12, 1893 |
| 974,253 | Forg | Nov. 1, 1910 |
| 1,550,651 | Charter | Aug. 18, 1925 |
| 1,670,253 | Gilbert et al. | May 15, 1928 |
| 2,358,844 | Woodward | Sept. 26, 1944 |

FOREIGN PATENTS

| Number | Country | Date |
| --- | --- | --- |
| 329,723 | Germany | Aug. 29, 1919 |